United States Patent [19]
Hoshina et al.

[11] Patent Number: 5,490,022
[45] Date of Patent: Feb. 6, 1996

[54] DATA STORAGE APPARATUS AND DISK FIXING METHOD FOR PREVENTING THE DEFORMATION OF DISKS BY REGULATING WHERE THE STORAGE APPARATUS IS FIXED TO THE DISK

[75] Inventors: Shigeru Hoshina, Yokohama; Nobuyuki Tanaka, Tokyo; Haruyuki Kurihara, Tokyo; Kiyoji Kikuchi, Tokyo, all of Japan

[73] Assignee: Kabushiki Kaisha Toshiba, Kawasaki, Japan

[21] Appl. No.: 132,252

[22] Filed: Oct. 6, 1993

[30]  Foreign Application Priority Data

Oct. 7, 1992  [JP]  Japan .................................. 4-268790

[51] Int. Cl.$^6$ ...................................................... G11B 17/08
[52] U.S. Cl. ................................... 360/98.08; 360/99.12
[58] Field of Search ............................. 360/99.12, 98.08

[56]  References Cited

U.S. PATENT DOCUMENTS

| | | | |
|---|---|---|---|
| 4,764,828 | 8/1988 | Gollbach | 360/98.08 |
| 4,918,545 | 4/1990 | Scheffel | 360/99.12 |
| 4,945,432 | 7/1990 | Matsudaira et al. | |
| 5,031,061 | 7/1991 | Hatch | 360/99.08 |
| 5,089,922 | 2/1992 | LeClair | |
| 5,243,481 | 9/1993 | Dunckley et al. | 360/99.12 |

FOREIGN PATENT DOCUMENTS

| | | | |
|---|---|---|---|
| 62-3679 | 1/1987 | Japan | |
| 1-264679 | 10/1989 | Japan | |
| 1-300483 | 12/1989 | Japan | |
| WO91/11004 | 7/1991 | WIPO | 360/98.08 |

*Primary Examiner*—A. J. Heinz
*Attorney, Agent, or Firm*—Finnegan, Henderson, Farabow, Garrett & Dunner

[57]  ABSTRACT

A disk drive apparatus comprises a disk for recording data and a drive motor for rotating the disk. The disk has obverse and reverse sides, a center hole, an unlevel portion with an uneven flatness on the obverse and reverse sides, situated around the center hole, and a level portion situated outside the unlevel portion and having level surfaces on the obverse and reverse sides. The disk is mounted on a hub of the motor such that the hub is passed through the center hole. The hub has at its one end a supporting portion facing the level portion of the disk. A disk retainer, having a press portion facing the level portion of the disk, is attached to the other end of the hub so as to press the disk toward the supporting portion.

5 Claims, 6 Drawing Sheets

F I G. 10

DATA STORAGE APPARATUS AND DISK FIXING METHOD FOR PREVENTING THE DEFORMATION OF DISKS BY REGULATING WHERE THE STORAGE APPARATUS IS FIXED TO THE DISK

BACKGROUND OF THE INVENTION

1. Field of the Invention

The present invention relates to a data storage apparatus, such as a disk drive apparatus, and a method for fixing disks to drive means.

2. Description of the Related Art

Recently, there have been increasing demands for the miniaturization and augmentation of capacity of magnetic disk apparatuses, such as hard disk drives (hereinafter referred to as HDDs). As a measure to increase the capacity of compact HDDs which use 2.5-inch disks or smaller ones, in particular, there is an effective method in which the recording density is improved by reducing the flying height of a magnetic head with respect to a magnetic disk.

Reducing the size and increasing the capacity of the HDDs by this method, however, involve a special problem, deformation of the disk caused as the disk is fixed to a spindle motor. If the disk is a deformed one, the gap between the magnetic head and the disk, that is, the flying height of the head above the disk, varies. The smaller the flying height, the larger this variation will be. The variation of the flying height results in an output fluctuation, which lowers the reliability of recording and reproducing operations.

Figure 1:
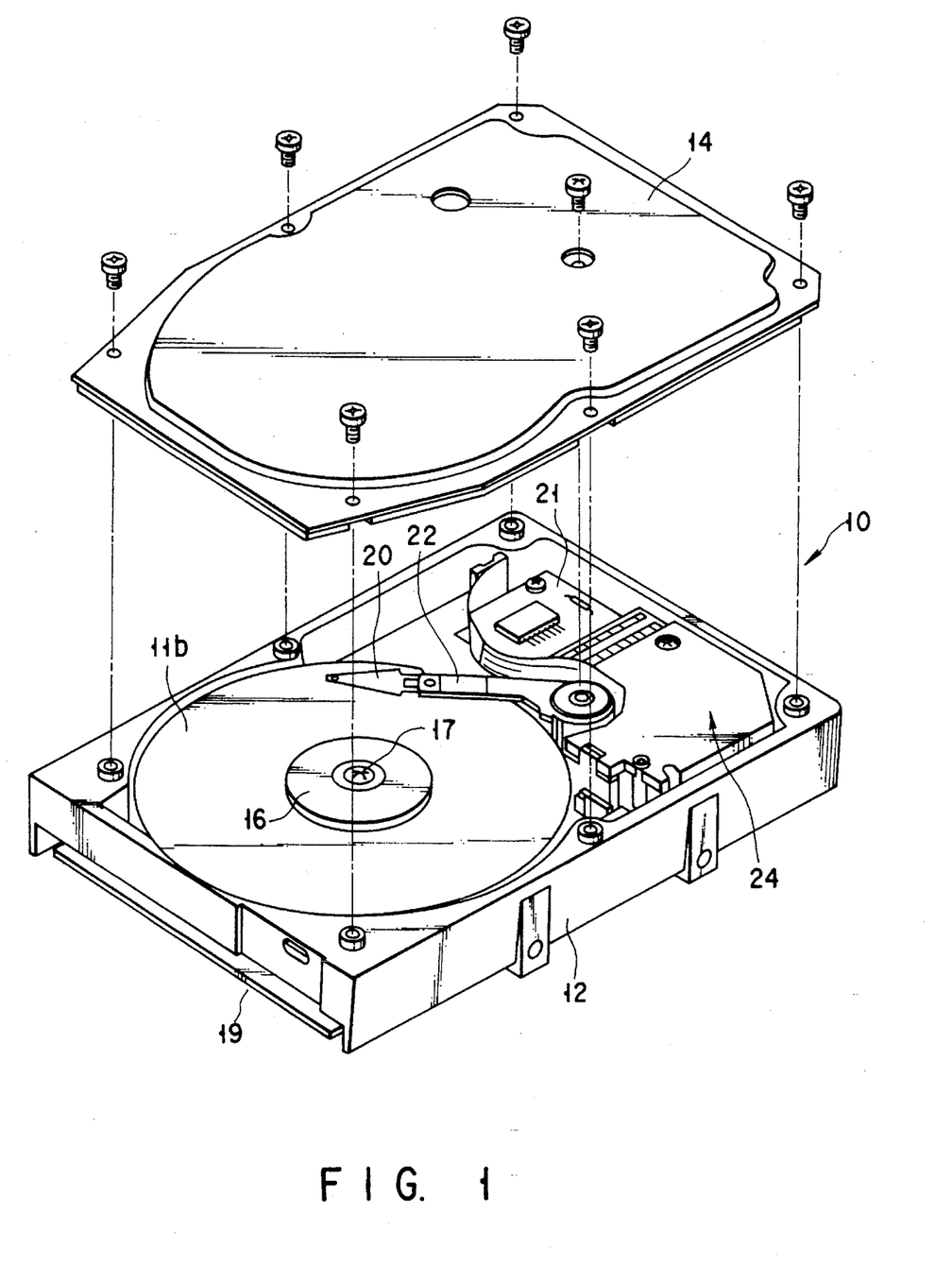
FIG. 1 is a perspective view showing a magnetic disk apparatus according to a first embodiment of the present invention.

A method of fixing magnetic disks is disclosed in FIG. 1 of U.S. Pat. No. 4,945,432. Specifically, in fixing disks, e.g., two in number, to the spindle motor, in any of the conventional HDDs, these disks are put in layers on a flange portion at one end of a hub of the motor with use of a spacer between them, and are fixed to the hub by means of a disk retainer at the other end of the hub. In doing this, the disk retainer is fixed to the hub by means of a plurality of screws. According to this method, however, the force acting on each disk is not uniform with respect to the circumferential direction, so that the disk is deformed in a manner such that it has as many indentations as the screws in the circumferential direction.

Also known is a method in which the disk retainer is fixed to the hub by means of one screw. According to this method, a uniform force acts on each disk with respect to the circumferential direction, so that the circumferential deformation of the disk is reduced. Since the disk is subject to a radial deformation, as well as the circumferential deformation, however, it is deformed in the shape of a bowl as a whole.

Even with the magnetic disk depressed in this manner, the magnetic head flies above the disk surface which is deformed in the longitudinal direction of the head. Thus, the flying height of that portion of the magnetic head, which corresponds to the magnetic gap, above the disk is different from the flying height in the case wherein the disk surface is flat, thereby influencing output signals. This arouses a serious problem in the use of the compact HDDs for 2.5-inch or smaller disks, in particular.

SUMMARY OF THE INVENTION

The present invention has been contrived in consideration of these circumstances, and its object is to provide a data storage apparatus and a disk fixing method, capable of preventing deformation of disks, thereby reducing variation of the flying height of a magnetic head, enjoying a high reliability, and ensuring an increased capacity.

In order to achieve the above object, a data storage apparatus according to the present invention comprises fixing means for fixing a disk for recording data to a rotating member of drive means, the disk having obverse and reverse sides, a center hole, an unlevel portion with an uneven flatness on at least one of the obverse and reverse sides, situated around the center hole, and a level portion situated outside the unlevel portion and having level surfaces on the obverse and reverse sides. The fixing means includes a supporting portion, formed on the rotating member and facing the level portion of the disk, and press means attached to the rotating member, for pressing the disk toward the supporting portion, the press means having a press portion facing the level portion of the disk.

According to the storage apparatus with this construction, the disk is fixed to the rotating member in a manner such that its level portion is held between the supporting portion and the press portion. Thus, the disk can be fixed with reliability, and its deformation can be reduced.

Further, a method for fixing a disk to a rotating member according to the present invention comprises the steps of mounting a disk on the rotating member in a manner such that a supporting portion on the rotating member faces the level portion of the disk, and attaching a press member, having a press portion, to the rotating member in a manner such that the press portion faces the level portion of the disk, and pressing the disk toward the supporting portion.

According to this method, the disk is fixed in a manner such that its level portion is held between the supporting portion of the rotating member and the press portion of the press member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention which are applied to HDDs will now be described in detail with reference to the accompanying drawings.

Figure 2:
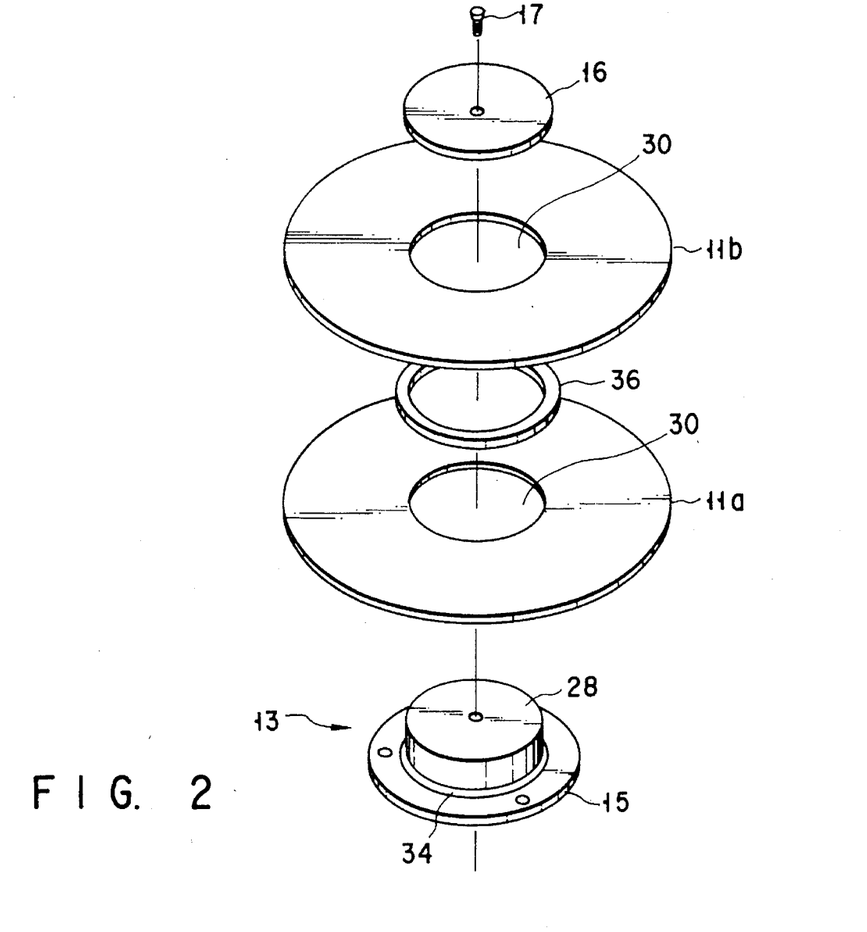
FIG. 2 is an exploded perspective view showing a spindle motor and a magnetic disk of the apparatus.

As shown in FIGS. 1 and 2, an HDD comprises a casing 10. The casing 10 includes a body 12, in the form of an open-topped rectangular box, having a rectangular bottom wall and side walls set up on the side edges of the bottom wall, and a top cover 14 screwed to the body and closing the top opening of the body.

The casing 10 contains two magnetic disks 11a and 11b, a spindle motor 13 for use as drive means for supporting and rotating the disks, a plurality of magnetic heads 20 (only one head is shown) for recording in and reproducing information from the disks, a carriage 22 supporting the heads for rotation, a voice coil motor 24 for rotating and positioning the carriage, a preamplifier 21, etc.

A printed circuit board 19 for controlling the operations of the spindle motor 13, voice coil motor 24, and magnetic heads 20 is screwed to the outer surface of the body 12 so as to face the bottom wall of the body.

As shown in FIGS. 1 and 2, the spindle motor 13 comprises a bracket 15 fixed to the bottom wall of the body 12 and a hub 28, for use as a rotating member, rotatably mounted on the bracket 15 by means of a pivot (not shown).

Each of the magnetic disks 11a and 11b includes a disk-shaped glass base having a center hole 30 and magnetic layers formed on either side of the base, and has a diameter of about 65 mm (2.5 inches). The disks 11a and 11b are fitted to the hub 28 of the spindle motor 13 and mounted on a flange portion 34 of the hub 28. A disk retainer 16 is fixed to the upper end of the hub 28 by a screw 17 so as to press the disks 11a and 11b to the flange portion 34 while an annular spacer is arranged between the disks 11a and 11b.

Before explaining a mounting structure for the disks in detail, there will be described experiments conducted by the inventors hereof on the causes of deformation of a disk.

The inventors hereof first examined the causes of concave deformation of the disk by using a magnetic disk apparatus whose disks were actually subject to concave deformation. The following is a description of the results of measurements and simulations based on analytic programs.

Figure 3A:
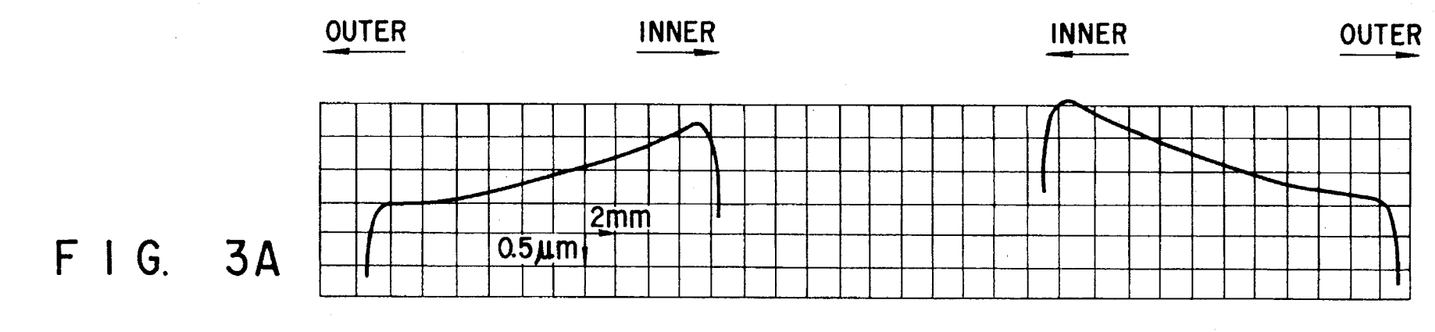
FIGS. 3A and 3B are diagrams schematically showing the configurations (radial direction) of the obverse and reverse, respectively, of the magnetic disk measured by means of a probe-type surface roughness measuring device.
Figure 3B:
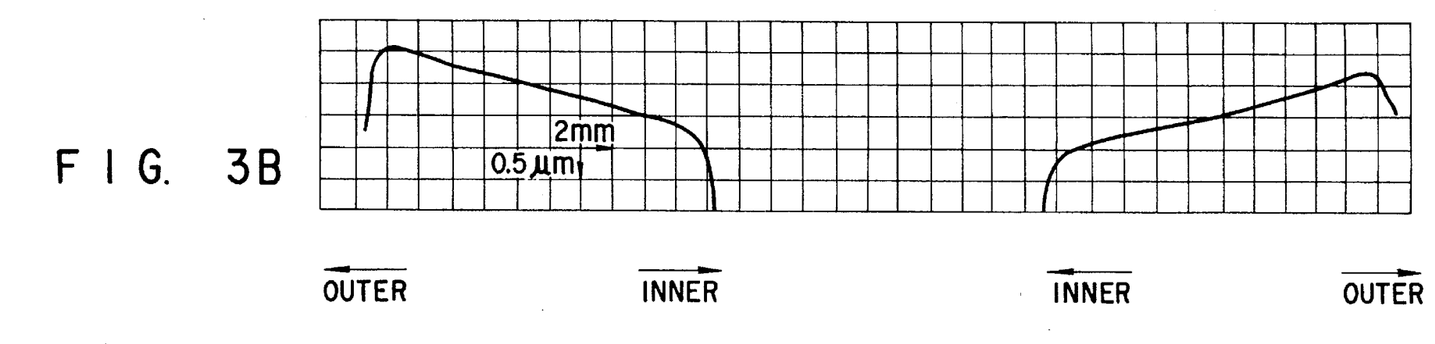

FIGS. 3A and 3B show the results of measurements of the surface configurations of the magnetic disk by means of a probe-type surface roughness measuring device. FIG. 3A shows the result of a measurement on the obverse of the disk along the diameter thereof, and FIG. 3B on the reverse of the disk. As seen from these drawings, the magnetic disk has a configuration such that it is warped about 1 μm in its axial direction from the inner periphery thereof toward the outer periphery. It is also seen that a sag or irregular portion 32a is formed at the inner peripheral edge portion of the disk which faces the center hole 30.

Figure 4:
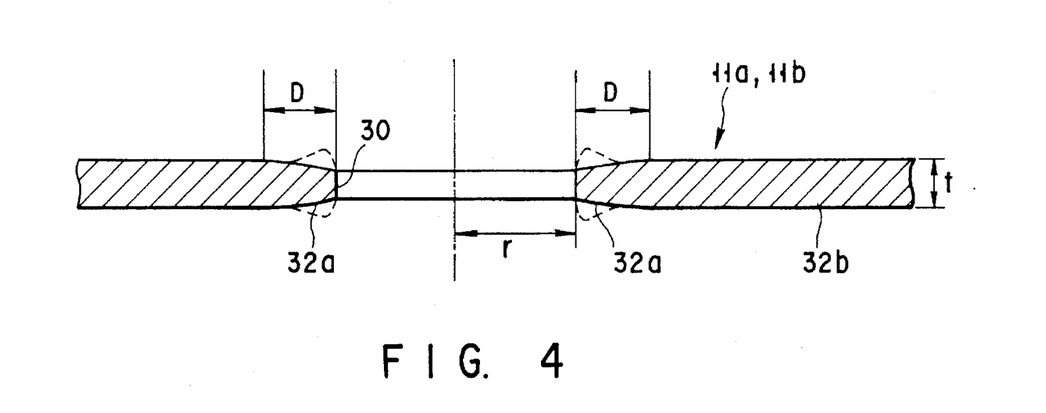
FIG. 4 is a sectional view showing the central portion of the magnetic disk.

This irregular portion will be described in brief. As shown in FIG. 4, the magnetic disk 11a, which is formed of glass or the like, for example, has the center hole 30 through which the hub 28 of the motor 13 is passed. During formation, the obverse and reverse surfaces of the disk 11a are made level and parallel to each other. However, the inner peripheral edge portion of the disk cannot be made perfectly level and parallel due to the sag or protuberance (indicated by broken line in FIG. 4). Thus, the disk 11a is formed having an unlevel portion 32a with an uneven flatness and a level portion 32b situated outside the unlevel portion.

From the results of the examination of the inventors, it has been proved that if the thickness of the disk and the radius of the center hole 30 are t and r, respectively, as shown in FIG. 4, a range D of the unlevel portion 32a, spreading in the radial direction of the disk, can be given by $$D < 1.5t, \text{ or} \quad (1)$$

$$D < 0.1r. \quad (2)$$

Figure 5:
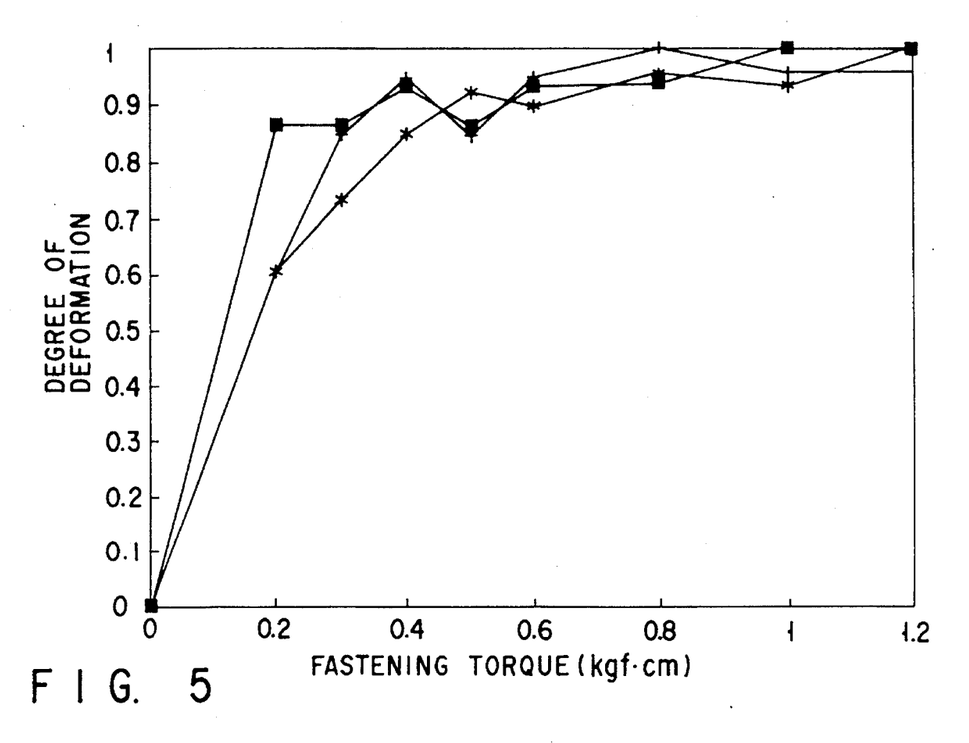
FIG. 5 is a graph showing the relationship between the degree of deformation of the disk and the fastening torque.
Figure 6:
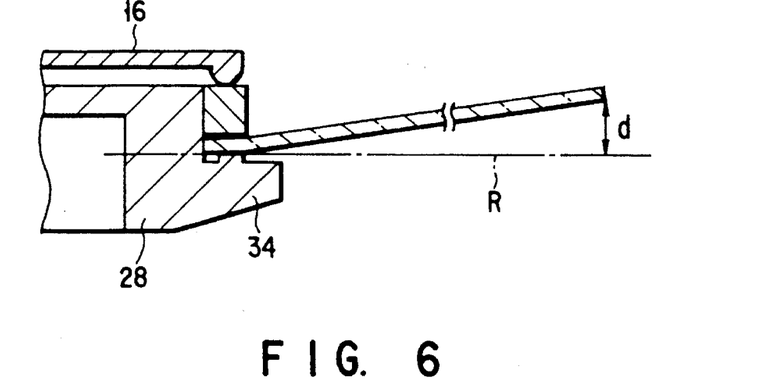
FIG. 6 is a view for explaining the degree of deformation of the disk.

FIG. 5 shows the dependence of the degree of deformation of disks on the fastening torque of a screw 17. The curves of FIG. 5 individually indicate the results of measurements on three different types of disks. In FIG. 5, the axis of ordinate represents the degree of deformation compared with the maximum deformation of 1 (reference). As shown in FIG. 6, the degree of deformation of the disk is measured as a distance d between the outer edge of the disk and a reference plane R extending through the center of the disk.

These results indicate that the following phenomena occur as each disk is fixed if each disk has the sag at its inner peripheral edge portion.

Figure 7A:
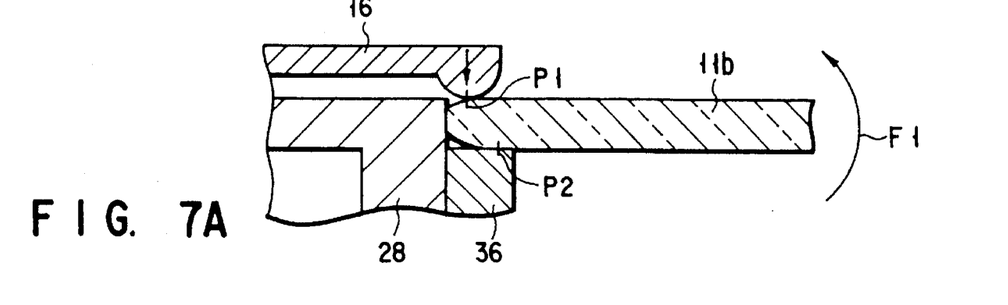
FIG. 7A is a sectional view showing deformation of a disk located between a disk retainer and a spacer.

As shown in FIG. 7A, since the contact portion of the disk retainer 16 on the disk 11b usually has an arcuate shape, a concentrated load acts on that circular contact area P1 of the disk which is coaxial with the disk and in contact with the disk retainer 16. A spacer 36, which is situated on the opposite side of the disk 11b to the disk retainer 16, is usually worked so that its end faces are flat. Accordingly, a gap is formed between the spacer 36 and the unlevel portion of the disk 11b, and load from the spacer 36 acts on that circular contact area P2 of the disk 11b which is coaxial with the disk and in contact with the spacer 36. Thus, these circular contact areas P1 and P2 of clamping forces from the disk retainer 16 and the spacer 36, which act on the obverse and reverse surfaces of the disk 11b, respectively, are inevitably deviated from each other in the diametrical direction of the disk. As a result, the disk 11b is subjected to a moment F1 in the axial direction of the disk 11b. The disk 11b is deformed or depressed by this moment F1. When the fastening torque attains a certain level, as shown in FIG. 5, the deformation of the disk is saturated, and cannot become greater. Probably, this is because the gap between the spacer 36 and the unlevel portion of the disk 11b is filled up by the deformation of the disk 11b.

Figure 7B:
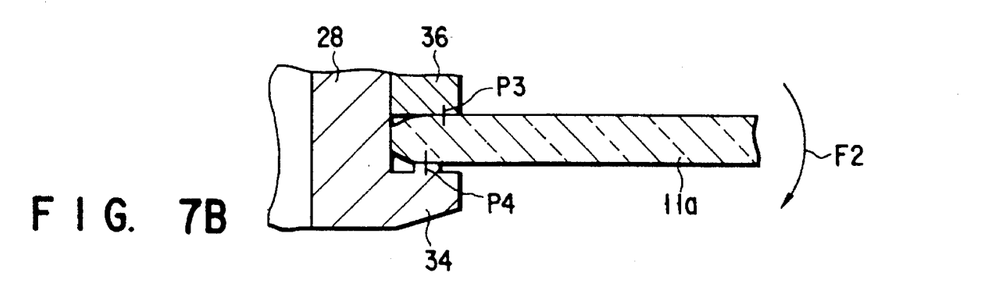
FIG. 7B is a sectional view showing deformation of a disk located between a flange portion of a hub and the spacer.

Also in the disk 11a, as shown in FIG. 7B, circular contact areas P3 and P4 of clamping forces from the spacer 36 and the flange portion 15 of the hub 14, which act on the obverse and reverse surfaces of the disk 11a, respectively, are inevitably deviated from each other in the diametrical direction of the disk. As a result, the disk 11a is subjected to a moment F2 in the axial direction of the disk 11b and deformed or depressed by this moment F2.

Figure 8:
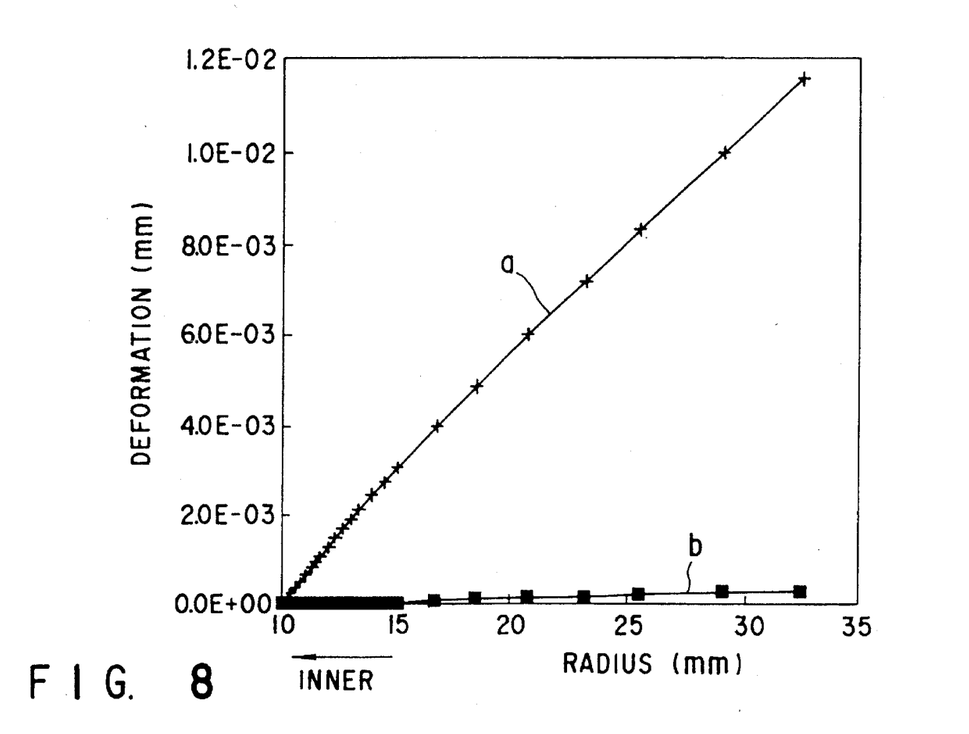
FIG. 8 is a graph showing the deformation of the disk based on a simulation.

FIG. 8 shows the results of a simulation of deformation of the disk fixed to the hub of the motor 13, based on analytic programs. In FIG. 8, characteristic curve a represents the result obtained when the disk shown in FIGS. 3A and 3B has the unlevel portion, and characteristic curve b represents the result obtained when the disk has no unlevel portion.

In FIG. 8, characteristic curve a represents a deformation of the disk which has an irregular portion 1.5 mm wide and 1 μm deep. Curve a indicates that the disk is deformed in a concave shape, and that the size of the deformation is about 12 μm in terms of the difference in height between the inner- and outer-most peripheries of the disk. The deformation on this level causes the flying height of the magnetic disk to vary by about 0.01 μm. If the flying height is 0.1 μm, therefore, the variation amounts to 10% of the flying height.

This implies that the deformation of the disk is caused by the very fine unlevel portion at the inner edge portion of the disk, and it adversely affects the flying height of the magnetic head and signal outputs.

Figure 9:
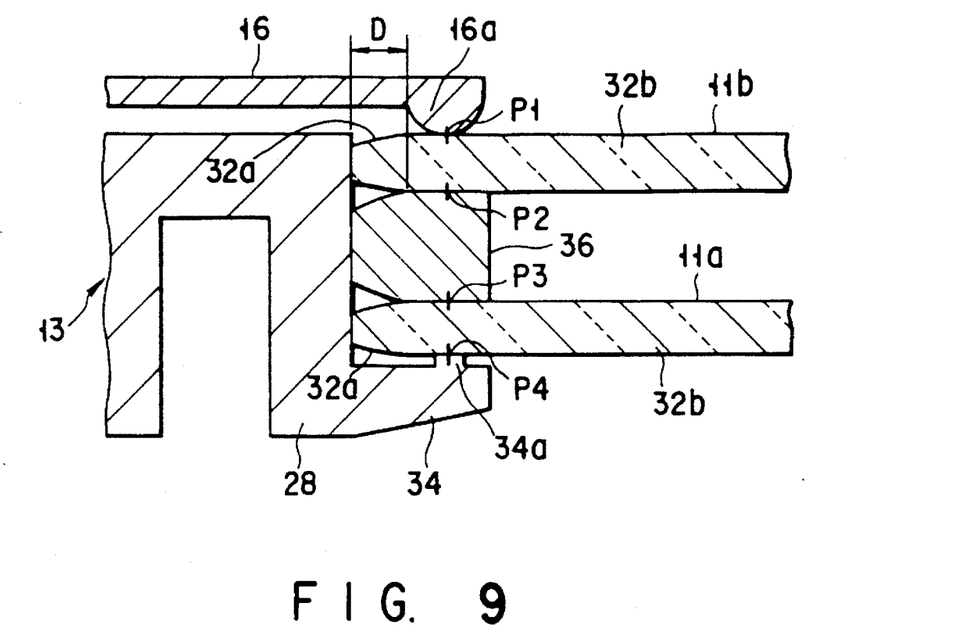
FIG. 9 is a sectional view showing a disk mounting portion of the apparatus according to the first embodiment.

According to a first embodiment of the present invention, a fixing portion of each disk is constructed in the following manner. In incorporating the disks 11a and 11b in the spindle motor 13, as shown in FIGS. 2 and 9, the disk 11a is first put on a flange portion 34 at one end of the hub 28 of the motor 13 in a manner such that the hub 28 is inserted in the center hole 30 of the disk 11a. Then, a ring-shaped spacer 36 and the disk 11b are put in layers along the hub 28, on the resulting structure. Thereafter, a disk retainer 16, for use as an elastic press member, is fixed to the other end of the hub 28 by means of a screw 17. The disks 11a and 11b and the spacer 36 are pressed against the flange portion 34 of the hub 28 by the elasticity of the disk retainer 16, and are fixedly held between the retainer 16 and the flange portion 34.

The flange portion 34 has an upward ring-shaped projection 34a for use as a supporting portion, which is in engagement with the level portion 32b (in a position beyond the range D of the unlevel portion 32a) of the disk 11a. Specifically, the projection 34a engages the lower surface of the disk in a position at a distance of 1.5t or 0.1r or more from the inner edge of the disk 11a, where t and r are the thickness of the disk 11a and the radius of the center hole 30 of the disk 11a, respectively.

The disk retainer 16 has a ring-shaped projection 16a, for use as a press portion, which is formed on the outer peripheral portion of its lower surface. That face of the projection 16a which is opposed to the disk 11b is arcuate in shape. Also, the projection 16a is in engagement with the upper surface of the level portion 32b of the disk 11b.

The spacer 36 is formed of stainless steel, aluminum, etc., and its contact surfaces on the disks 11a and 11b, which are flat, are in contact with the respective level portions 32b of the disks.

As the level portions 32b of the disks 11a and 11b are held between the flange portion 34, disk retainer 16, and spacer 36 in this manner, circular contact regions P1, P2, P3 and P4 of clamping forces from these members, which act on the disks 11a and 11b, can be coaxial with one another and equal to one another in the diameter when the disks 11a and 11b are pressed toward the flange portion 34 by the disk retainer 16. Thus, unevenness of fixing forces on the disks 11a and 11b can be eliminated, so that a moment can be prevented from being produced in each disk. As a result, the deformation of the disks 11a and 11b can be reduced, and the disks can be fixed to the hub 28 with reliability. By reducing the deformation of the disks 11a and 11b, moreover, the variation of the flying height of the magnetic heads 20 above the disks can be lessened to ensure highly reliable outputs. Also, the recording density can be improved by reducing the flying height.

There are no special restrictions on the shapes of the flange portion 34 and the disk retainer 16, provided that the disks 11a and 11b can be fixed in a manner such that these members are in contact with the level portions 32b. In some cases, the unlevel portions 32a of the disks 11a and 11b may involve protuberances, such as the one indicated by broken line in FIG. 4, as well as the sag. Accordingly, those portions of the spacer 36 which face the unlevel portions 32a are formed with a round or chamfer surface, lest the contact regions be shifted by the protuberances.

Figure 10:
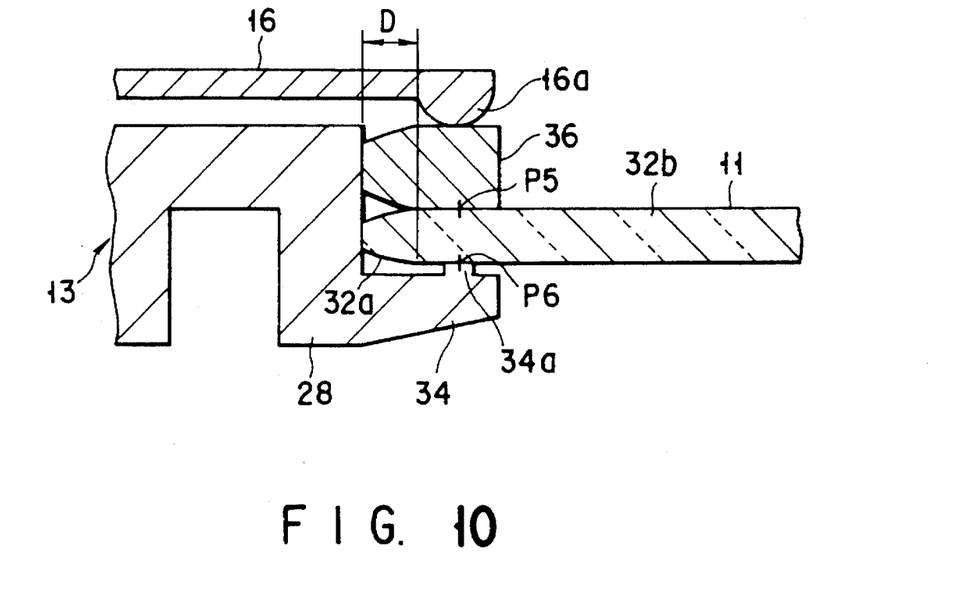
FIG. 10 is a sectional view showing a disk mounting portion of a magnetic disk apparatus according to a second embodiment of the invention.

FIG. 10 partially shows an arrangement of a magnetic disk apparatus of the single-disk type according to a second embodiment of the present invention. In the single-disk apparatus, one disk 11 is held and fixed between a flange portion 34 and a combination of a disk retainer 16 and a spacer 36.

Also in the second embodiment, as a level portion 32b of the disk 11 is held between a projection 34a of the flange portion 34 and a projection 16a of the disk retainer 16, action points P5 and P6 of clamping forces from these members, which act on the disk 11, can be aligned in a direction parallel to the axis of the disk 11 when the disk 11 is pressed toward the flange portion 34 by the disk retainer 16. As a result, the deformation of the disk 11 can be reduced.

In the second embodiment, there are no special restrictions on the shapes of the flange portion 34 and the disk retainer 16, provided that the disk 11 can be fixed in a manner such that these members are in contact with the level portion.

In the magnetic disk apparatus of the single-disk type, moreover, a spacer 36 may be interposed between the disk 11 and the disk retainer 16 and/or between the disk 11 and the flange portion 34. Also in this case, as in the first embodiment, a round or chamfer surface is formed on the inner edge portion of the spacer 36, as shown in FIG. 10, lest the action points be shifted by a protuberance formed on the inner edge portion of the disk.

It is to be understood that the present invention is not limited to the embodiments described above, and that various changes and modifications may be effected therein by one skilled in the art without departing from the scope or spirit of the invention. For example, the present invention is not limited to the magnetic disk apparatuses, and may be applied to any other suitable data recording/reproducing apparatuses, such as optical disk apparatuses, which use a single board as a record medium.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A data storage apparatus comprising:

a disk for recording data, the disk having obverse and reverse sides, a center hole, a portion of reduced or increased thickness situated around an inner peripheral edge defining the center hole, and a portion of constant thickness situated outside the portion of reduced or increased thickness and having surfaces on the obverse and reverse sides substantially parallel to each other;

drive means for rotating the disk, the drive means including a hub passed through the center hole of the disk; and fixing means for fixing the disk to the hub, the fixing means including an annular supporting portion formed on the hub to be coaxial with the center hole and facing the disk, and press means attached to the hub, for pressing the disk towards the supporting portion, the press means having an annular press portion being coaxial with the center hole and facing the disk, each of the supporting portion and the press portion being arranged in a position at a distance from 1.5 t or more from the inner peripheral edge of the disk so as to face the portion of constant thickness on the disk, where t is the thickness of the disk.

2. An apparatus according to claim 1, which further comprises a spacer held between the supporting portion and the disk and/or between the press portion and the disk, the spacer having a level contact surface in contact with the constant thickness portion of the disk.

3. An apparatus according to claim 1, which further comprises a plurality of said disks and spacers arranged between the adjacent disks, the spacers each having a level contact surface in contact with the constant thickness portion of each corresponding disk.

4. A method for fixing a disk for recording data to a rotating member for rotating the disk, the disk having obverse and reverse sides, a center hole, a portion of reduced or increased thickness situated around an inner peripheral edge defining the center hole, and a portion of constant thickness situated outside the portion of reduced or increased thickness and having surfaces on the obverse and reverse sides substantially parallel to each other, said method comprising the steps of:

mounting the disk on the rotating member in an manner such that an annular supporting portion on the rotating member is located coaxially with the center hole of the disk and faces the portion of constant thickness on the disk in a predetermined position at a distance of 1.5 t from the inner peripheral edge of the disk, where t is the thickness of the disk; and attaching a press member, having an annular press portion, to the rotating member in a manner such that the press portion is located coaxially with the center hole of the disk and faces the portion of constant thickness on the disk in said predetermined position, so as to press the disk towards the supporting portion.

5. A method according to claim 4, which further comprises mounting a spacer, having an annular level contact portion, on the rotating member such that the level contact portion is in contact with the constant thickness portion of the disk in said predetermined position.

* * * * *

UNITED STATES PATENT AND TRADEMARK OFFICE
CERTIFICATE OF CORRECTION

PATENT NO. : 5,490,022
DATED : February 06, 1996
INVENTOR(S) : Shigeru HOSHINA et al.

It is certified that error appears in the above-indentified patent and that said Letters Patent is hereby corrected as shown below:

Claim 4, column 8, line 6, "an" should read --a--.

Signed and Sealed this

Thirty-first Day of December, 1996

Attest:

BRUCE LEHMAN

Attesting Officer        Commissioner of Patents and Trademarks